(12) United States Patent
Ogawa et al.

(10) Patent No.: US 9,653,742 B2
(45) Date of Patent: May 16, 2017

(54) FUEL CELL SYSTEM

(75) Inventors: Tetsuya Ogawa, Wako (JP); Ayatoshi Yokokawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 163 days.

(21) Appl. No.: 14/113,673

(22) PCT Filed: Mar. 5, 2012

(86) PCT No.: PCT/JP2012/056214
§ 371 (c)(1),
(2), (4) Date: Oct. 24, 2013

(87) PCT Pub. No.: WO2012/147420
PCT Pub. Date: Nov. 1, 2012

(65) Prior Publication Data
US 2014/0051000 A1  Feb. 20, 2014

(30) Foreign Application Priority Data
Apr. 28, 2011  (JP) .................................. 2011-101252

(51) Int. Cl.
H01M 8/04 (2016.01)
H01M 8/00 (2016.01)
(Continued)

(52) U.S. Cl.
CPC ..... H01M 8/0444 (2013.01); H01M 8/04373 (2013.01); H01M 8/04425 (2013.01);
(Continued)

(58) Field of Classification Search
CPC .............................. H01M 8/04373; C01B 3/00
See application file for complete search history.

(56) References Cited

U.S. PATENT DOCUMENTS 6,846,585 B2    1/2005  Robb et al.
2003/0235726 A1*  12/2003  Kelly ................... C01B 3/34
                                                              429/425
(Continued)

FOREIGN PATENT DOCUMENTS

EP  1 188 712 A2  3/2002
EP  1 840 997 A1  10/2007
(Continued)

OTHER PUBLICATIONS

U.S. Office Action issued in co-pending U.S. Appl. No. 14/113,660 dated Jun. 9, 2015, 10 pages.
(Continued)

Primary Examiner — Matthew Merkling
(74) Attorney, Agent, or Firm — Rankin, Hill & Clark LLP

(57) ABSTRACT

A fuel cell system control device includes a carbon amount determination unit for determining the carbon amount in fuel gas supplied to a fuel cell stack depending on required output of the stack, a temperature detector unit for detecting temperature of a steam reformer and temperature of an evaporator, an S/C determination unit for determining a range of steam/carbon ratio based on the temperature of the steam reformer, a water supply amount determination unit for determining a range of the water supply amount to the evaporator based on the carbon amount and the steam/carbon ratio, an evaporator operating state determination unit for determining whether the temperature of the evaporator is a temperature determined based on the range of the water supply amount, and a reformer control unit for controlling the steam reformer and a partial oxidation reformer based on the result of the evaporator operating state determination unit.

5 Claims, 7 Drawing Sheets

(51) Int. Cl.
  *C01B 3/02* (2006.01)
  *H01M 8/0444* (2016.01)
  *H01M 8/0432* (2016.01)
  *H01M 8/0438* (2016.01)
  *H01M 8/04746* (2016.01)
  *H01M 8/04828* (2016.01)
  *H01M 8/0612* (2016.01)
  *H01M 8/04492* (2016.01)

(52) U.S. Cl.
  CPC ... *H01M 8/04776* (2013.01); *H01M 8/04828* (2013.01); *H01M 8/0618* (2013.01); *H01M 8/0631* (2013.01); *H01M 8/04492* (2013.01)

(56) References Cited

U.S. PATENT DOCUMENTS

| | | |
|---|---|---|
| 2004/0038095 A1 | 2/2004 | Kushibiki et al. |
| 2005/0089732 A1 | 4/2005 | Aoyama et al. |
| 2008/0219901 A1 | 9/2008 | Yoon et al. |
| 2009/0053569 A1 | 2/2009 | Perry et al. |
| 2011/0053017 A1 | 3/2011 | Takahashi |

FOREIGN PATENT DOCUMENTS

| | | |
|---|---|---|
| EP | 1 909 349 | 4/2008 |
| EP | 2 426 769 A1 | 3/2012 |
| JP | 2004-192958 | 7/2004 |
| JP | 2004-319420 | 11/2004 |
| JP | 2005-285693 | 10/2005 |
| JP | 2005-293951 | 10/2005 |
| JP | 2006-190605 | 7/2006 |
| JP | 2007-59377 | 3/2007 |
| JP | 2007-091542 | 4/2007 |
| JP | 2007-179756 | 7/2007 |
| JP | 2010-211931 | 9/2010 |
| JP | 2010-238595 | 10/2010 |
| JP | 2011-060553 | 3/2011 |
| WO | 2010/125731 A1 | 11/2010 |

OTHER PUBLICATIONS

International Search Report dated Jul. 3, 2012.
This application co-pending with U.S. Appl. No. 14/113,660, filed Oct. 24, 2013.
Japanese Office Action dated Aug. 5, 2014 with English Translation, Application No. JP 2011-101252, corresponding to the present application, U.S. Appl. No. 14/113,673, 5 pages.
Japanese Office Action dated Aug. 12, 2014 with English Translation, Application No. JP 2011-101244, corresponding to co-pending U.S. Appl. No. 14/113,660, 3 pages.
European Office Action dated Dec. 23, 2014, Application No. 12714403.8, 4 pages.

* cited by examiner

FUEL CELL SYSTEM

TECHNICAL FIELD

The present invention relates to a fuel cell system including a fuel cell module and a control device.

BACKGROUND ART

Typically, a solid oxide fuel cell (SOFC) employs a solid electrolyte of ion-conductive solid oxide such as stabilized zirconia. The electrolyte is interposed between an anode and a cathode to form an electrolyte electrode assembly (hereinafter also referred to as MEA). The electrolyte electrode assembly is interposed between separators (bipolar plates). In use, generally, predetermined numbers of the electrolyte electrode assemblies and the separators are stacked together to form a fuel cell stack.

Normally, a hydrogen gas produced from hydrocarbon based raw fuel by a reformer is used as a fuel gas supplied to the fuel cell. In the reformer, in general, a reformed gas (fuel gas) is produced, e.g., by applying partial oxidation reforming or steam reforming to such hydrocarbon based raw fuel, e.g., fossil fuel such as metal or LNG.

In this case, since the partial oxidation reformer induces exothermic reaction, the reaction can be started at relatively low temperature, and thus the start-up performance and the follow up performance are good. However, the reforming efficiency is poor.

In contrast, the steam reformer has good reforming efficiency. However, since the steam reformer induces endothermic reaction, the start-up performance and the follow up performance are poor at relatively low temperature.

In this regard, for example, a method of operating a fuel cell disclosed in Japanese Laid-Open Patent Publication No. 2007-179756 (hereinafter referred to as Conventional Technique 1) is known. The operating method includes the steps of mixing a plurality of types of reforming gases including hydrocarbon gas, reforming the plurality of types of reforming gases mixed in the mixing step by use of reforming catalyst to produce a hydrogen-containing gas, and generating electricity by a solid oxide fuel cell by use of the hydrogen-containing gas obtained in the reforming step.

It is monitored whether the mixing step, the reforming step or the power generation step is performed under predetermined heat-balancing conditions or not. If the mixing step, the reforming step or the power generation step is performed under the predetermined heat-balancing conditions, then water vapor is mixed with a hydrocarbon gas in the mixing step, and thereafter steam reforming is performed in the reforming step. If the mixing step, the reforming step or the power generation step is not performed under the predetermined heat-balancing conditions, then an oxygen-containing gas is mixed with the hydrocarbon gas in the mixing step, and thereafter partial oxidation reforming is performed in the reforming step.

In the operating method according to the disclosure, if the heat balance is changed from the optimum state, reforming is switched from steam reforming to partial oxidation reforming for making it possible to perform the reforming without water vapor and prevent carbon deposition. Further, since partial oxidation reforming is an exothermic reaction, the temperature which has been lowered can be raised again, and it contributes to restoration of the heat-balancing to the optimum state. Thus, if the optimum state of heat-balancing is not satisfied due to various factors during operation of the fuel cell, and the heat energy is insufficient for the reforming step, then reforming is switched to partial oxidation reforming thereby to compensate for the inefficient heat energy, and thus adjustment thereof is achieved. Further, by switching of the reforming method, large variation in the heat balance can be prevented, and instability in the output of power generation of the fuel cell is eliminated.

Further, a fuel cell system disclosed in Japanese Laid-Open Patent Publication No. 2010-238595 (hereinafter referred to as Conventional Technique 2) is known. The fuel cell system includes a reformer for performing steam reforming of a fuel gas supplied to a fuel cell, water supply means for supplying water to the reformer, and control means for controlling the water supply means.

The water supply means includes a water tank for storing water to be supplied to the reformer, a pump for supplying the water stored in the water tank to the reformer under pressure, flow rate detection means for detecting the amount of water supplied to the reformer by the pump, and pressure detection means for detecting the pressure of the fuel gas in the reformer. At least at the time of starting operation, the control means switches operation of the pump from the suspension state to the pressurized water supply state to start supply of the water under pressure. Thereafter, the control means performs a water supply determination process for determining whether the water is supplied to the reformer or not based on the detection result by the pressure detection means.

In Conventional Technique 2, operation of the pump is switched from the suspension state to the pressurized water supply state to start supply of the water to the reformer under pressure. Thereafter, water supply determination process for determining whether the water is supplied to the reformer or not is performed based on the detection result by the pressure detection means. By the water supply determination process, since it is possible to determine whether the water is supplied to the reformer or not based on the detection value of the pressure detection means regardless of the detection value of the flow rate detection means, it is possible to determine whether the water is supplied to the reformer or not regardless of the amount of the supplied water.

SUMMARY OF INVENTION

In Conventional Technique 1, the detection value of the power generation amount is used as a parameter of the heat-balancing conditions. If the power generation amount becomes less than a predetermined value, then reforming is switched from steam reforming to partial oxidation reforming to raise the temperature in the fuel cell. Thus, the operation range by steam reforming is narrowed, and a high efficiency output cannot be achieved suitably. Further, though carbon deposition is determined based on the steam/carbon (S/C) ratio and the temperature of the reformer, in Conventional Technique 1, the relationship between the carbon deposition, the steam/carbon (S/C) ratio and the temperature of the reformer is not considered. Therefore, carbon deposition cannot be suppressed suitably.

Further, in Conventional Technique 2, it is determined whether the water is supplied to the reformer or not at the time of starting operation, but there is no disclosure regarding the control of selective operation of partial oxidation reforming and steam reforming. Therefore, high efficiency output is not obtained suitably.

Further, when the supply of water becomes insufficient, it is no longer possible to perform operation. Moreover, though carbon deposition is determined based on the steam/ carbon (S/C) ratio and the temperature of the reformer, in Conventional Technique 2, the relationship between the carbon deposition, the steam/carbon (S/C) ratio and the temperature of the reformer is not considered. Therefore, carbon deposition cannot be suppressed easily.

The present invention has been made to solve the problems of these types, and an object of the present invention is to provide a fuel cell module in which it is possible to suitably maintain a desired start-up performance, a desired follow-up performance, and a desired efficiency in the fuel cell module, and achieve improvement in the durability.

The present invention relates to a fuel cell system including a fuel cell module and a control device. In the fuel cell system, the fuel cell module includes a fuel cell stack formed by stacking a plurality of fuel cells for generating electricity by electrochemical reactions of a fuel gas and an oxygen-containing gas, a partial oxidation reformer for reforming a mixed gas of a raw fuel chiefly containing hydrocarbon and an oxygen-containing gas, a steam reformer for reforming a mixed gas of the raw fuel and water vapor, and an evaporator for evaporating water and supplying the water vapor to the steam reformer.

The control device includes a carbon amount determination unit for determining the amount of carbon in the fuel gas supplied to the fuel cell stack depending on the required output of the fuel cell stack, a temperature detector unit for detecting the temperature of the steam reformer and the temperature of the evaporator, an S/C determination unit for determining a range of the steam/carbon ratio based on the temperature of the steam reformer, a water supply amount determination unit for determining a range of the water supply amount to the evaporator based on the amount of carbon and the steam/carbon ratio, an evaporator operating state determination unit for determining whether or not the temperature of the evaporator is a temperature determined based on the range of the water supply amount, and a reformer control unit for controlling the steam reformer and the partial oxidation reformer based on the determination result of the evaporator operating state determination unit.

In the present invention, based on the conditions of the fuel gas, the steam reformer, the evaporator, the steam/carbon ratio, and the water supply amount, it is possible to suitably and selectively use the highly efficient steam reformer and the partial oxidation reformer having good performance in starting operation and good responsiveness. Therefore, the fuel cell module can balance a highly efficient function with a function having a good start-up performance and a good response performance.

Further, even if operation of the fuel cell stack may exceed the operating range of the steam reformer, e.g., due to variation in the load on the fuel cell stack, the partial oxidation reformer can be operated for compensation. Thus, it becomes possible to follow the low output and the load variation, and suppress fuel shortage and carbon deposition resulting from the shortage of reforming, and improvement in the durability of the fuel cell module is achieved suitably.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
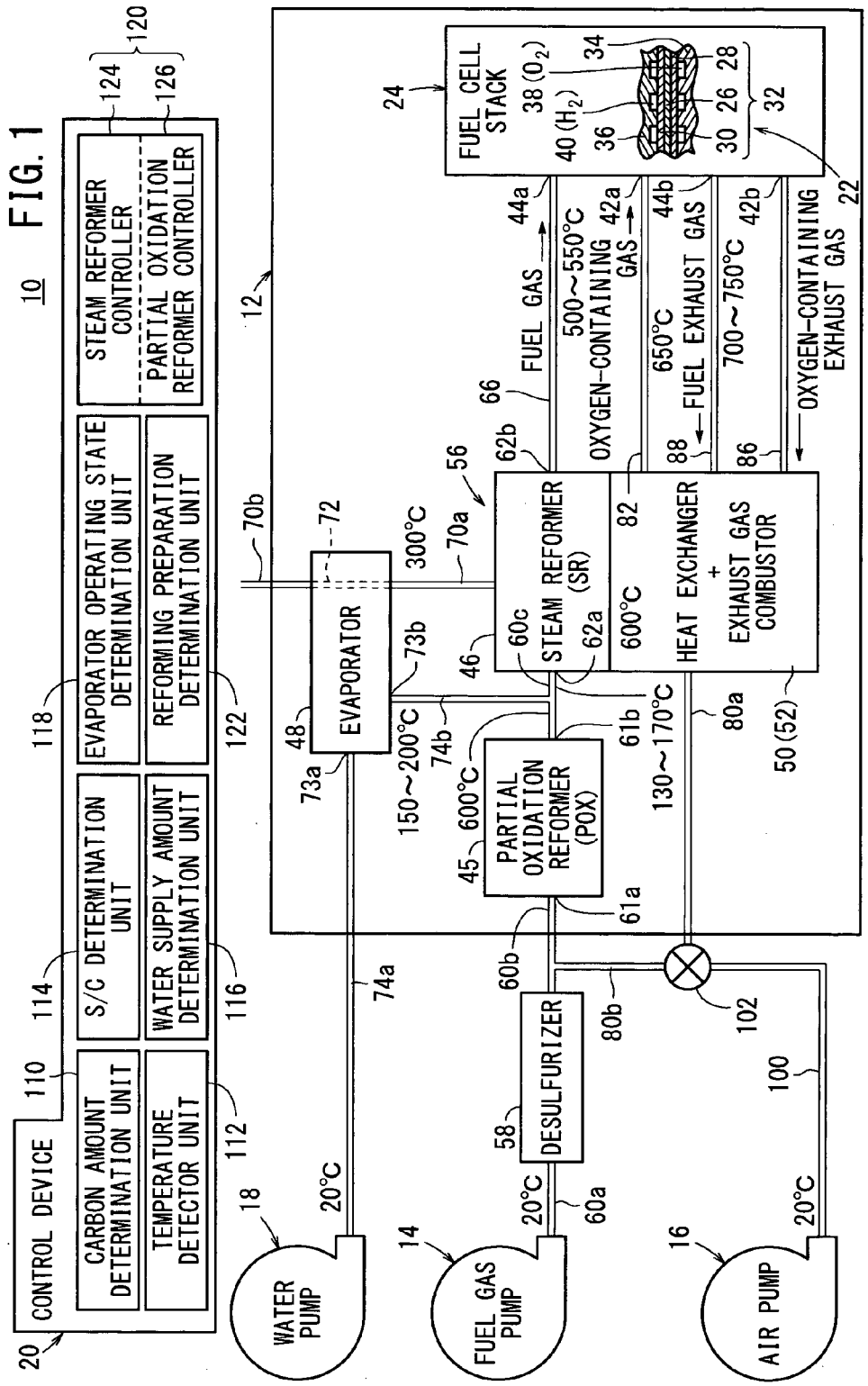
FIG. 1 is a diagram schematically showing a structure of a fuel cell system according to an embodiment of the present invention.

A fuel cell system 10 according to an embodiment of the present invention shown in FIG. 1 is used in various applications, including stationary and mobile applications. For example, the fuel cell system 10 is mounted on a vehicle.

The fuel cell system 10 includes a fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a fuel cell stack 24 formed by stacking a plurality of solid oxide fuel cells 22 in a vertical direction (or in a horizontal direction). For example, the fuel cell 22 includes an electrolyte electrode assembly 32 (MEA). The electrolyte electrode assembly 32 includes a cathode 28, an anode 30, and an electrolyte 26 interposed between the cathode 28 and the anode 30. For example, the electrolyte 26 is made of ion-conductive solid oxide such as stabilized zirconia.

A cathode side separator 34 and an anode side separator 36 are provided on both sides of the electrolyte electrode assembly 32. An oxygen-containing gas flow field 38 for supplying an oxygen-containing gas to the cathode 28 is formed in the cathode side separator 34, and a fuel gas flow field 40 for supplying a fuel gas to the anode 30 is formed in the anode side separator 36. As the fuel cell 22, various types of conventional SOFC can be adopted.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a partial oxidation reformer (PDX) 45 for reforming a mixed gas of a raw fuel chiefly containing hydrocarbon and the oxygen-containing gas, a steam reformer (SR) 46 for reforming a mixed gas of the raw fuel and water vapor, an evaporator 48 for evaporating water and supplying the water vapor to the steam reformer 46, a heat exchanger 50 for raising the temperature of the oxygen-containing gas by heat exchange with a combustion gas and supplying the oxygen-containing gas to the fuel cell stack 24, and an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas thereby to produce the combustion gas.

Basically, the fuel cell module 12 includes the fuel cell stack 24 and FC (fuel cell) peripheral equipment 56. The FC peripheral equipment 56 includes the partial oxidation reformer 45, the steam reformer 46, the evaporator 48, the heat exchanger 50, and the exhaust gas combustor 52. Further, as described later, no exhaust gas pipes are provided for connecting the steam reformer 46, the heat exchanger 50 and the exhaust gas combustor 52.

In the FC peripheral equipment 56, the exhaust gas combustor 52 is provided integrally in the heat exchanger 50. The steam reformer 46 is provided adjacent to one end of the heat exchanger 50.

Figure 2:
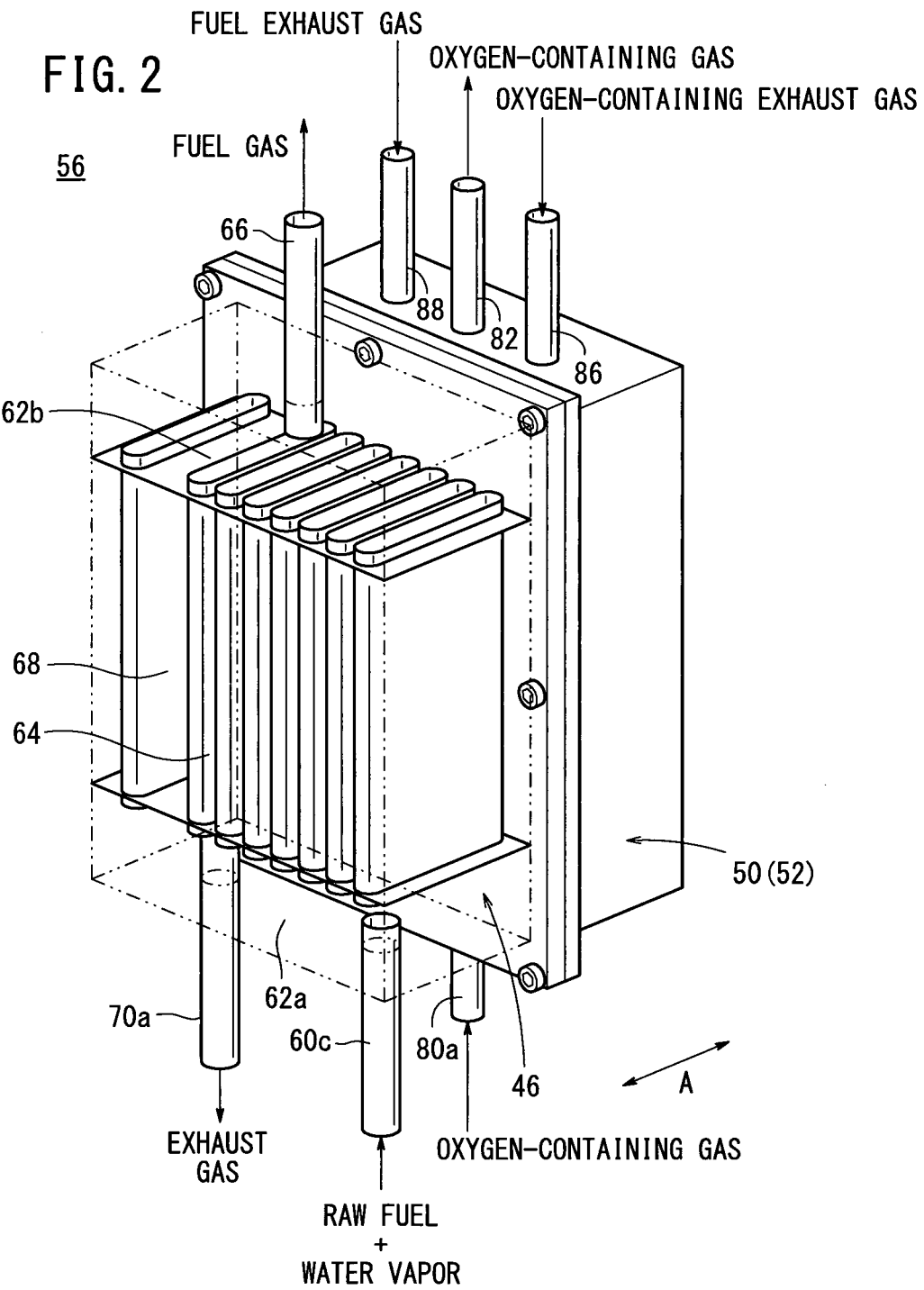
FIG. 2 is a perspective view showing main components of FC (fuel cell) peripheral equipment of the fuel cell system.
Figure 3:
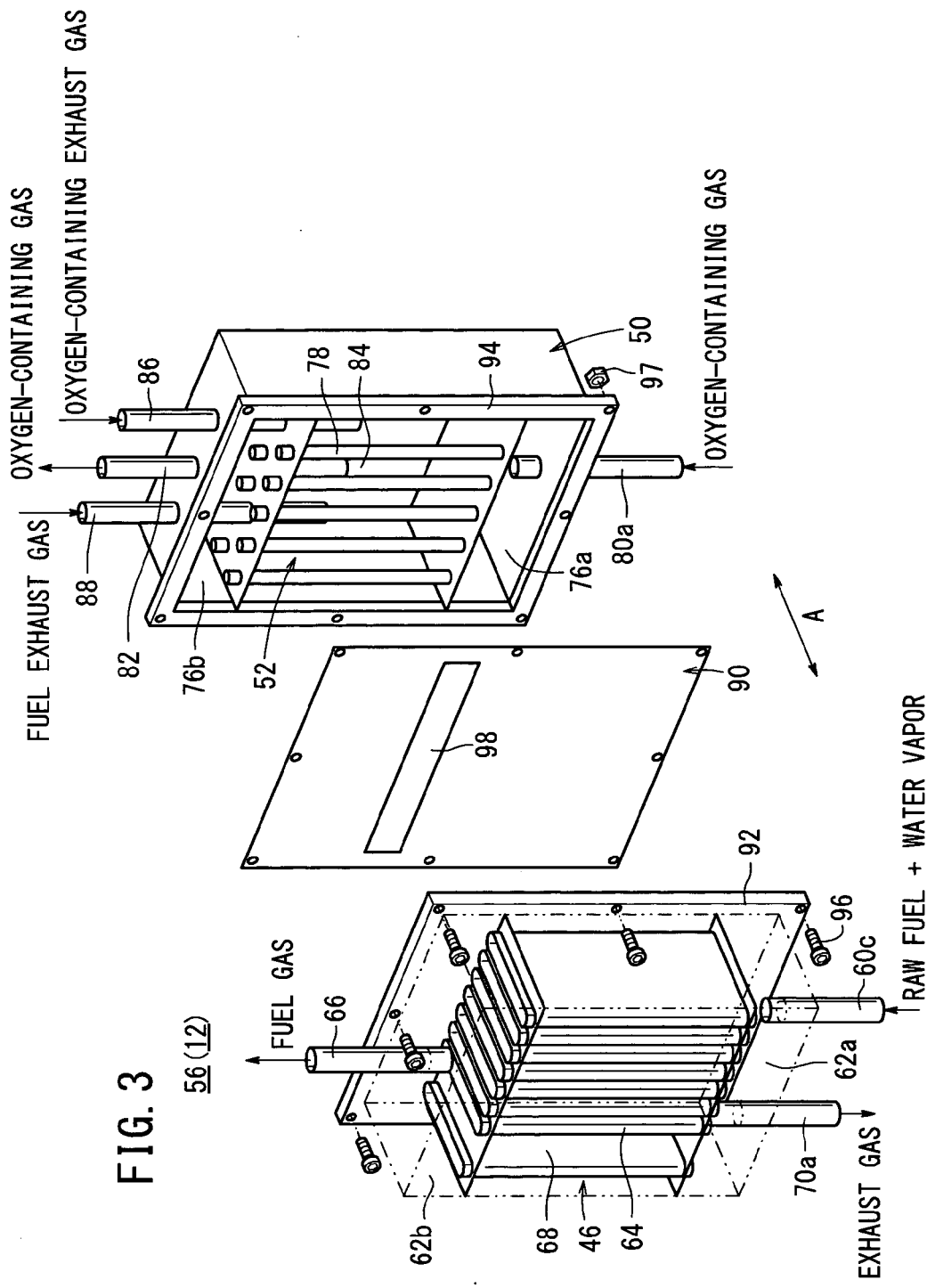
FIG. 3 is an exploded perspective view showing main components of the FC peripheral equipment.

As shown in FIGS. 2 and 3, the heat exchanger 50 is provided upright, and as described later, the oxygen-containing gas flows vertically upwardly. The steam reformer 46 is provided upright, and the reformed gas flows vertically upwardly. The steam reformer 46 is directly attached to one side (one end) of the heat exchanger 50. The steam reformer 46 and the heat exchanger 50 (including the exhaust gas combustor 52) are stacked in a horizontal direction indicated by an arrow A.

The evaporator 48, the partial oxidation reformer 45, and a desulfurizer 58 for removing sulfur compounds contained in the city gas (raw fuel) are provided below the heat exchanger 50 and the steam reformer 46.

The steam reformer 46 is a preliminary reformer for steam-reforming higher hydrocarbon ($C_{2+}$) such as ethane ($C_2H_6$), propane ($C_3H_8$), and butane ($C_4H_{10}$) in the city gas (raw fuel) thereby to produce the fuel gas chiefly containing methane ($CH_4$), hydrogen, and CO. The operating temperature of the steam reformer 46 is several hundred ° C.

The fuel cell 22 operates at high temperature, such as several hundred ° C. Methane in the fuel gas is reformed at the anode 30 to obtain hydrogen and CO, and the hydrogen and CO are supplied to a portion of the electrolyte 26 that is positioned adjacent to the anode 30.

The partial oxidation reformer 45 is a preliminary reformer for partially oxidation-reforming higher hydrocarbon ($C_{2+}$) such as ethane ($C_2H_6$), propane ($C_3H_8$), and butane ($C_4H_{10}$) in the city gas (raw fuel) thereby to produce the fuel gas chiefly containing hydrogen, and CO. The operating temperature of the partial oxidation reformer 45 is several hundred ° C.

As shown in FIG. 1, a raw fuel channel 60a of the raw fuel supply apparatus 14 is connected to the inlet of the desulfurizer 58 and a raw fuel supply channel 60b is connected to the outlet of the desulfurizer 58. This raw fuel supply channel 60b is connected to a mixed gas inlet 61a of the partial oxidation reformer 45, and a fuel gas pipe 60c connected to a fuel gas outlet 61b of the partial oxidation reformer 45 is connected to a mixed gas supply chamber (mixed gas inlet) 62a of the steam reformer 46.

As shown in FIGS. 2 and 3, the mixed gas supply chamber 62a is connected to lower ends of a plurality of reforming pipes 64, and a fuel gas discharge chamber (fuel gas outlet) 62b is connected to upper ends of the reforming pipes 64. The fuel gas discharge chamber 62b is connected to one end of a fuel gas channel 66, and the other end of the fuel gas channel 66 is connected to the fuel gas supply passage 44a of the fuel cell stack 24 (see FIG. 1). Each of the reforming pipes 64 is filled with catalyst (not shown) in the form of pellets or supports catalyst (not shown) in the form of grains for inducing reforming reaction.

A heating space 68 is formed between the reforming pipes 64. An end of an exhaust gas pipe 70a is opened to the heating space 68, and as shown in FIG. 1, the other end of the exhaust gas pipe 70a is connected to an inlet of a heating channel 72 of the evaporator 48. An exhaust pipe 70b is connected to an outlet of the heating channel 72 of the evaporator 48.

A water channel 74a of the water supply apparatus 18 is connected to a water inlet 73a of the evaporator 48, and water flowing through the water channel 74a is heated by the exhaust gas flowing along the heating channel 72. As a result, water vapor is produced. One end of a water vapor pipe 74b is connected to a water vapor outlet 73b of the evaporator 48, and the other end of the water vapor pipe 74b is merged to the fuel gas pipe 60c at a position downstream of the partial oxidation reformer 45. For example, an ejector (not shown) is provided at the merging position, and the raw fuel (or reform gas) flows through the fuel gas pipe 60c, whereby water vapor is sucked from the water vapor pipe 74b into the fuel gas pipe 60c.

As shown in FIG. 3, an oxygen-containing gas supply chamber 76a is provided on the lower side of the heat exchanger 50, and an oxygen-containing gas discharge chamber 76b is provided on the upper side of the heat exchanger 50. Both ends of a plurality of oxygen-containing gas pipes 78 are connected to the oxygen-containing gas supply chamber 76a and the oxygen-containing gas discharge chamber 76b.

One end of a first oxygen-containing gas supply channel 80a is provided in the oxygen-containing gas supply chamber 76a. One end of an oxygen-containing gas channel 82 is provided in the oxygen-containing gas discharge chamber 76b, and the other end of the oxygen-containing gas channel 82 is connected to the oxygen-containing gas supply passage 42a of the fuel cell stack 24 (see FIG. 1).

A plurality of the oxygen-containing gas pipes 78 are placed in a space inside the heat exchanger 50. Further, a combustion chamber 84 of the exhaust gas combustor 52 is formed inside the heat exchanger 50. The combustion chamber 84 functions as a heat source for raising the temperature of the oxygen-containing gas by combustion reaction of the fuel gas (more specifically, fuel exhaust gas) and the oxygen-containing gas (more specifically, oxygen-containing exhaust gas).

An oxygen-containing exhaust gas channel 86 and a fuel exhaust gas channel 88 extend from the oxygen-containing gas discharge chamber 76b side and through the oxygen-containing gas discharge chamber 76b, and one end of the oxygen-containing exhaust gas channel 86 and one end of the fuel exhaust gas channel 88 are provided in the combustion chamber 84. As shown in FIG. 1, the other end of the oxygen-containing exhaust gas channel 86 is connected to the oxygen-containing gas discharge passage 42b of the fuel cell stack 24, and the other end of the fuel exhaust gas channel 88 is connected to the fuel gas discharge passage 44b of the fuel cell stack 24.

As shown in FIG. 3, a wall plate (wall) 90 is provided between the steam reformer 46 and the heat exchanger 50. The wall plate 90 is sandwiched between a flange 92 of the steam reformer 46 and a flange 94 of the heat exchanger 50. These components are fixed together using a plurality of bolts 96 and nuts 97. An opening 98 is formed in the wall plate 90 for supplying a combustion gas produced in the combustion chamber 84 of the heat exchanger 50 to the heating space 68 of the steam reformer 46.

As shown in FIG. 1, the oxygen-containing gas supply apparatus 16 has an oxygen-containing gas regulator valve (oxygen-containing gas distribution mechanism) 102 for distributing the oxygen-containing gas from an oxygen-containing gas channel 100 to the heat exchanger 50 and the partial oxidation reformer 45, i.e., to the first oxygen-containing gas supply channel 80*a* and a second oxygen-containing gas supply channel 80*b*. The second oxygen-containing gas supply channel 80*b* is positioned between the desulfurizer 58 and the partial oxidation reformer 45, and connected to the raw fuel supply channel 60*b*.

The control device 20 includes a carbon amount determination unit 110 for determining the amount of carbon in the fuel gas supplied to the fuel cell stack 24 depending on the output required in the fuel cell stack 24, a temperature detector unit 112 for detecting the temperature of the steam reformer 46 and the temperature of the evaporator 48, an S/C determination unit 114 for determining a range of the steam/carbon (S/C) ratio based on the temperature of the steam reformer 46, a water supply amount determination unit 116 for determining a range of the water supply amount to the evaporator 48 based on the amount of carbon and the steam/carbon ratio, an evaporator operating state determination unit 118 for determining whether or not the temperature of the evaporator 48 is a temperature determined based on the range of the water supply amount to the evaporator 48, a reformer control unit 120 for controlling the steam reformer 46 and the partial oxidation reformer 45 based on the determination result of the evaporator operating state determination unit 118, and a reforming preparation determination unit 122 for determining whether it is required to prepare for reforming by the partial oxidation reformer 45 or not.

The reformer control unit 120 includes a steam reformer controller 124 for controlling the steam reformer 46 if it is determined that the temperature of the evaporator 48 is a temperature determined based on the range of the water supply amount, and a partial oxidation reformer controller 126 for controlling the partial oxidation reformer 45 if it is determined that the temperature of the evaporator 48 is not the temperature determined based on the range of the water supply amount.

Figure 4:
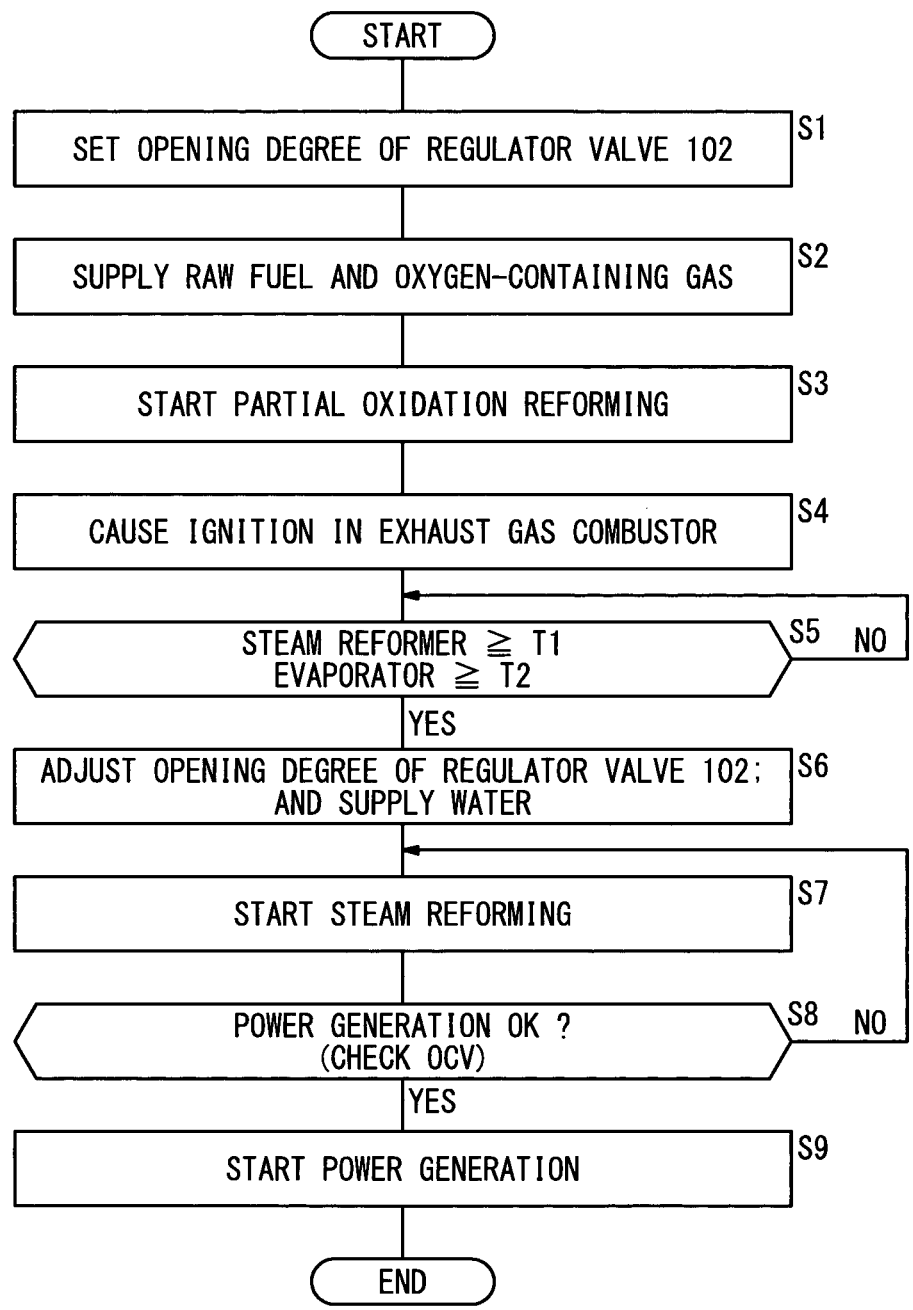
FIG. 4 is a flow chart illustrating an operational sequence from start-up operation to power generation of the fuel cell system.
Figure 5:
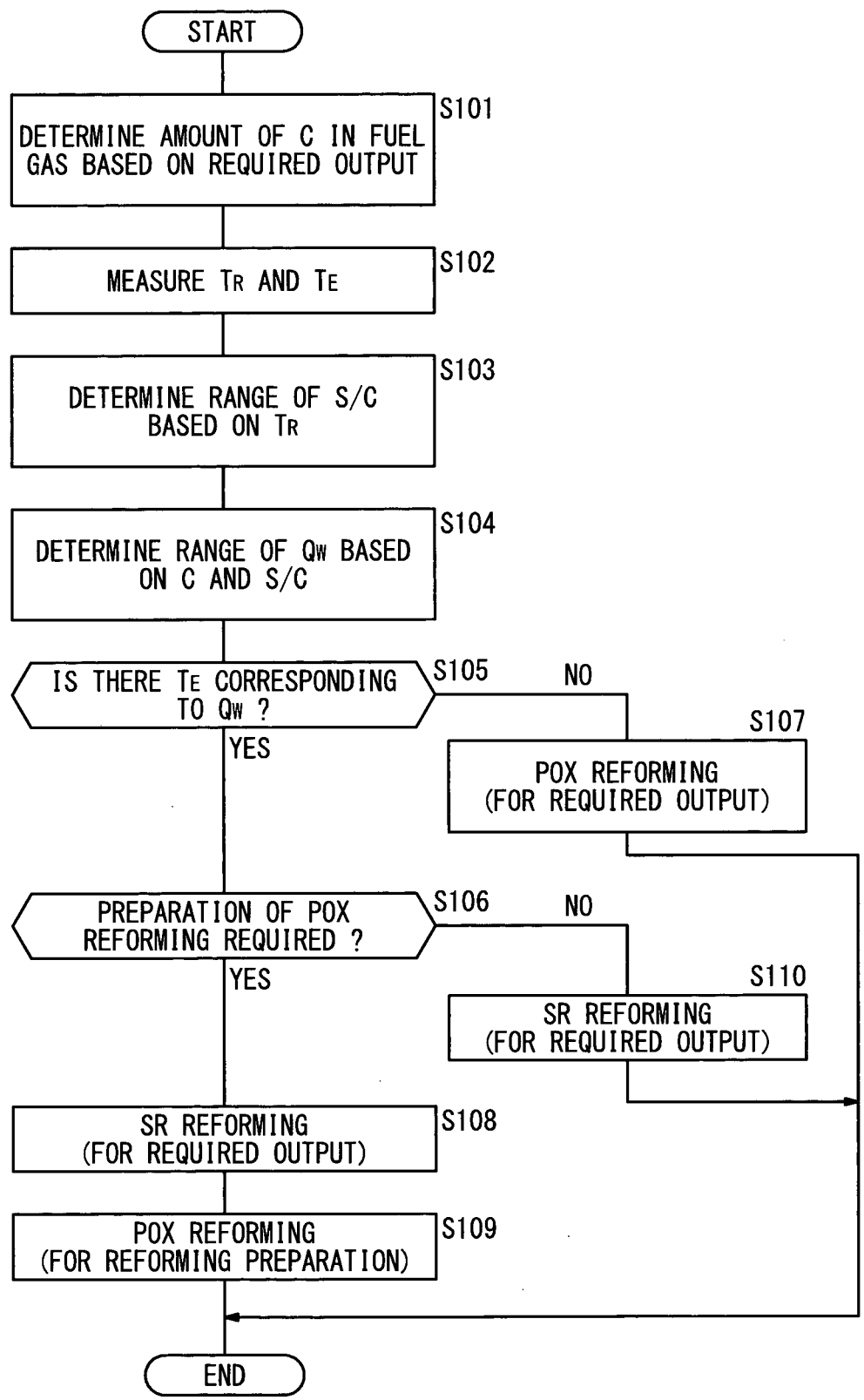
FIG. 5 is a flow chart showing an operational sequence of a low-variation operation of the fuel cell system.

Next, operation of the fuel cell system 10 will be described below with reference to flow charts shown in FIGS. 4 and 5.

Firstly, at the time of starting operation of the fuel cell system 10, the opening degree of the oxygen-containing gas regulator valve 102 is determined (step S1). More specifically, the raw fuel supply apparatus 14 is operated, and the opening degree of the oxygen-containing gas regulator valve 102 is adjusted such that the air (oxygen-containing gas) and the raw fuel such as city gas (containing $CH_4$, $C_2H_6$, $C_3H_8$, $C_4H_{10}$) required for partial oxidation reforming are supplied (step S2). The control of the partial oxidation reforming is performed based on the air fuel ratio ($O_2/C$) (the number of moles of oxygen in the supplied air/the number of moles of carbon in the supplied raw fuel). The air and raw fuel are supplied to the partial oxidation reformer 45 at the optimum air-fuel ratio.

In the raw fuel supply apparatus 14, the raw fuel supplied to the raw fuel channel 60*a* is desulfurized by the desulfurizer 58, and then the raw fuel is supplied to the mixed gas inlet 61*a* of the partial oxidation reformer 45 through the raw fuel supply channel 60*b*. In the oxygen-containing gas supply apparatus 16, after the air is supplied to the oxygen-containing gas channel 100, the air is distributed to the first oxygen-containing gas supply channel 80*a* and to the second oxygen-containing gas supply channel 80*b* at their respective predetermined amounts through the oxygen-containing gas regulator valve 102. The air distributed to the second oxygen-containing gas supply channel 80*b* is mixed with the raw fuel in the raw fuel supply channel 60*b*, and the mixture containing the air is supplied to the mixed gas inlet 61*a* of the partial oxidation reformer 45.

Thus, partial oxidation reforming by the partial oxidation reformer 45 is started (step S3). For example, if $O_2/C=0.5$, partial oxidation reaction ($2CH_4+O_2 \rightarrow 4H_2+2CO$) occurs. The partial oxidation reaction is an exothermic reaction, and a hot reduction gas (at about 600° C.) is produced by the partial oxidation reformer 45.

As shown in FIGS. 2 and 3, the hot reduction gas is supplied to the mixed gas supply chamber 62*a* of the steam reformer 46 through the fuel gas pipe 60*c*, and then, the reduction gas moves from lower ends to upper ends of the reforming pipes 64. The hot reduction gas is temporarily supplied to the fuel gas discharge chamber 62*b*, and then, the reduction gas is supplied to the fuel gas supply passage 44*a* of the fuel cell stack 24 through the fuel gas channel 66 (see FIG. 1).

In the fuel cell stack 24, after the hot reduction gas flows through the fuel gas flow field 40, the fuel gas is discharged from the fuel gas discharge passage 44*b* to the fuel exhaust gas channel 88. Thus, the hot reduction gas produced by the partial oxidation reformer 45 heats the steam reformer 46 and the fuel cell stack 24.

As shown in FIG. 3, the fuel exhaust gas channel 88 is opened to the combustion chamber 84 of the exhaust gas combustor 52, and the fuel gas flows into the combustion chamber 84. In the combustion chamber 84, the reduction gas (fuel gas) and the oxygen-containing gas are ignited by an ignition device (not shown) such as an igniter or a glow to produce a combustion gas (step S4).

The combustion gas generated in the combustion chamber 84 heats the heat exchanger 50, and also heats air supplied from the first oxygen-containing gas supply channel 80*a*. Further, the combustion gas moves to the heating space 68 of the steam reformer 46 through the opening 98 formed in the wall plate 90. Thus, the steam reformer 46 is heated. The exhaust gas pipe 70*a* is provided in the heating space 68, and the exhaust gas pipe 70*a* is connected to the heating channel 72 of the evaporator 48. In the structure, after the combustion gas heats the evaporator 48, the combustion gas is discharged from the exhaust pipe 70*b*.

Then, the control proceeds to step S5 to determine whether or not the temperature of the steam reformer 46 is a predetermined temperature T1 or more and the temperature of the evaporator 48 is a predetermined temperature T2 or more. For example, the predetermined temperature T1 is 550° C., and for example, the predetermined temperature T2 is 150° C. If it is determined that the temperature of the steam reformer 46 is the predetermined temperature T1 or more and the temperature of the evaporator 48 is the predetermined temperature T2 or more (YES in step S5), then the control proceeds to step S6.

In step S6, for transition from partial oxidation reaction to steam reforming reaction, the opening degree of the oxygen-containing gas regulator valve 102 is adjusted, and the water supply apparatus 18 is operated. By adjustment of the opening degree of the oxygen-containing gas regulator valve 102, supply of the air to the second oxygen-containing gas supply channel 80b is stopped, and the amount of air supplied from the first oxygen-containing gas supply channel 80a to the heat exchanger 50 is increased. Thus, since only the raw fuel is supplied to the partial oxidation reformer 45, partial oxidation reaction is not induced, and the raw fuel is supplied to the fuel gas pipe 60c.

In the water supply apparatus 18, water is supplied to the evaporator 48. The water vaporized in the evaporator 48 is supplied from the water vapor pipe 74b to the fuel gas pipe 60c, and then, mixed with the raw fuel, and supplied to the mixed gas supply chamber 62a.

As shown in FIGS. 2 and 3, the mixed gas of the raw fuel and the water vapor supplied to the mixed gas supply chamber 62a moves from the lower ends to the upper ends of the reforming pipes 64. In the meanwhile, the mixed gas is heated by the combustion gas supplied into the heating space 68, and is subjected to steam reforming by the catalyst in the form of pellets. As a result, hydrocarbon of $C_{2+}$ is removed therefrom to produce a reformed gas chiefly containing methane, and the steam reforming reaction ($CH_4$+$H_2O \rightarrow 3H_2$+CO) occurs (step S7).

The reformed gas is temporarily supplied as a heated fuel gas to the fuel gas discharge chamber 62b, and then, the reformed gas is supplied to the fuel gas supply passage 44a of the fuel cell stack 24 through the fuel gas channel 66 (see FIG. 1).

In the fuel cell stack 24, after the heated fuel gas flows through the fuel gas flow field 40, the fuel gas is discharged from the fuel gas discharge passage 44b to the fuel exhaust gas channel 88. As shown in FIG. 3, since the fuel exhaust gas channel 88 is opened to the combustion chamber 84 of the exhaust gas combustor 52, the fuel gas flows into the combustion chamber 84.

On the other hand, in the oxygen-containing gas supply apparatus 16, the air is supplied to the first oxygen-containing gas supply channel 80a through the oxygen-containing gas regulator valve 102, and the air flows into the oxygen-containing gas supply chamber 76a of the heat exchanger 50.

As shown in FIG. 3, after the air flows into the oxygen-containing gas supply chamber 76a, the air is heated by the combustion gas supplied into the combustion chamber 84 (heat exchange between the air and the combustion gas occurs) while it is moving from the lower ends to the upper ends of the oxygen-containing gas pipes 78. The heated air is firstly supplied to the oxygen-containing gas discharge chamber 76b, and then, the air is supplied through the oxygen-containing gas channel 82 to the oxygen-containing gas supply passage 42a of the fuel cell stack 24 (see FIG. 1).

In the fuel cell stack 24, after the heated air flows through the oxygen-containing gas flow field 38, the air is discharged from the oxygen-containing gas discharge passage 42b into the oxygen-containing exhaust gas channel 86. As shown in FIG. 3, since the oxygen-containing exhaust gas channel 86 is opened to the combustion chamber 84 of the exhaust gas combustor 52, the air is supplied into the combustion chamber 84.

As described above, the heated air and the heated fuel gas flow through the fuel cell stack 24 to raise the temperature of the fuel cell stack 24. Then, the control proceeds to step S8 for determining whether or not the fuel cell stack 24 is ready for power generation. More specifically, OCV (open-circuit voltage) of the fuel cell 22 is measured, and if the OCV reaches a predetermined value, then it is determined that the fuel cell stack 24 is ready for power generation (YES in step S8). Thus, power generation is started in the fuel cell stack 24 (step S9).

During power generation of the fuel cell stack 24, in the same manner as in the case of the start-up operation, the air flows through the oxygen-containing gas flow field 38, and the fuel gas flows through the fuel gas flow field 40. Therefore, the air is supplied to the cathode 28 of each fuel cell 22, and the fuel gas is supplied to the anode 30 of each fuel cell 22 to induce chemical reactions at the cathode 28 and the anode 30 for generating electricity.

The air consumed in the reaction (containing unconsumed air) is discharged as an oxygen-containing exhaust gas to the oxygen-containing exhaust gas channel 86. Further, the fuel gas consumed in the reaction (containing unconsumed fuel gas) is discharged as the fuel exhaust gas to the fuel exhaust gas channel 88. The oxygen-containing exhaust gas and the fuel exhaust gas are supplied to the exhaust gas combustor 52, and consumed in combustion in the exhaust gas combustor 52. When the temperature of the fuel gas exceeds the self-ignition temperature of the fuel gas, combustion of the air and the fuel gas is started in the combustion chamber 84.

Next, a load-variation operation of the fuel cell system 10 will be described with reference to flow charts in FIG. 5.

Firstly, based on a required output of the fuel cell stack 24, the amount of carbon C in the fuel gas is determined by the carbon amount determination unit 110 (step S101). Then, the control proceeds to step S102. In step S102, the temperature detector unit 112 detects the temperature $T_R$ of the steam reformer 46 and the temperature $T_E$ of the evaporator 48 using temperature sensors (not shown).

Figure 6:
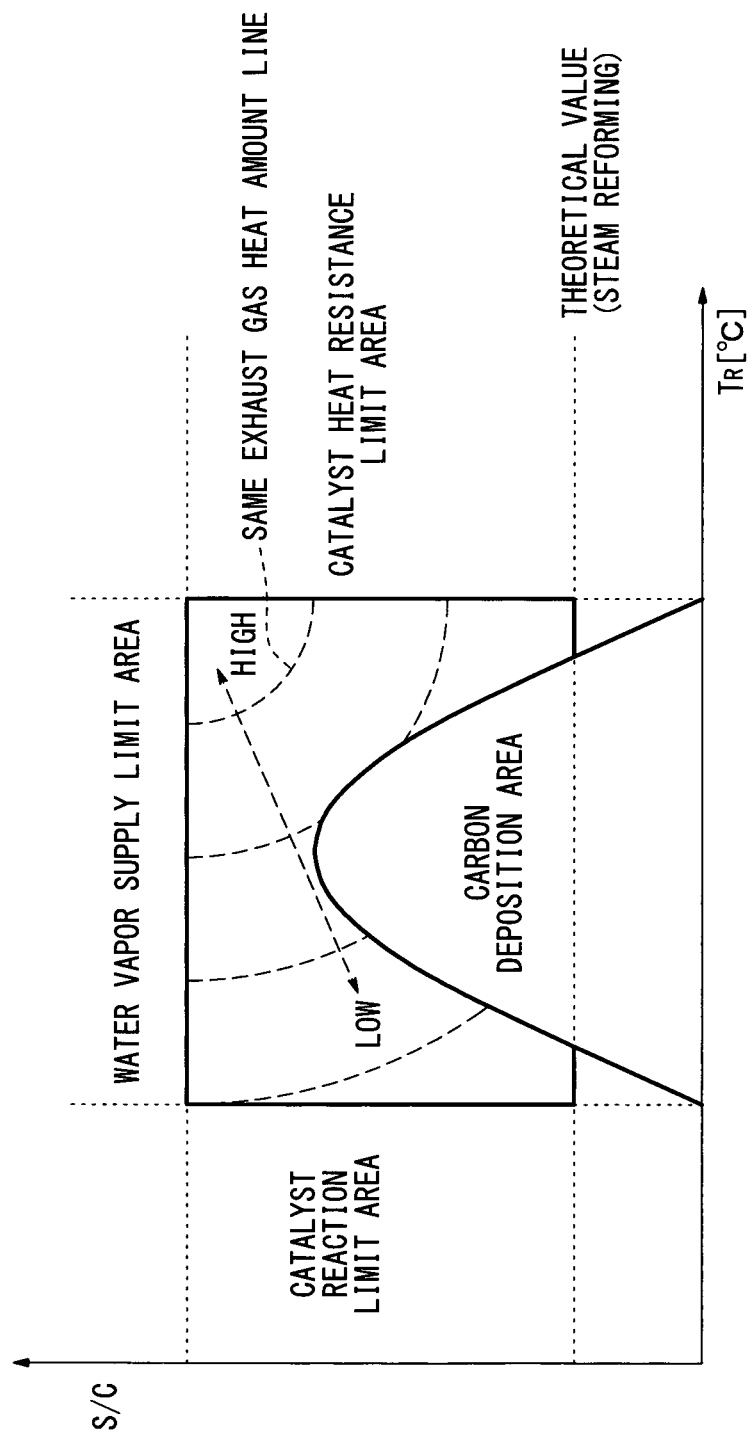
FIG. 6 is a graph showing a relationship between the temperature of a steam reformer and S/C (steam/carbon)

In step S103, the S/C determination unit 114 determines a range of the steam/carbon (S/C) ratio based on the temperature $T_R$ of the steam reformer 46. As shown in FIG. 6, the steam/carbon ratio is set to be within an S/C area which is not less than a theoretical value (1.0) and not more than a water vapor supply limit area, and the temperature $T_R$ of the steam reformer 46 is set to be within a temperature area between a catalyst reaction limit area and a catalyst heat resistance limit area. Further, the carbon deposition area is excluded from the S/C area and the temperature area.

Figure 7:
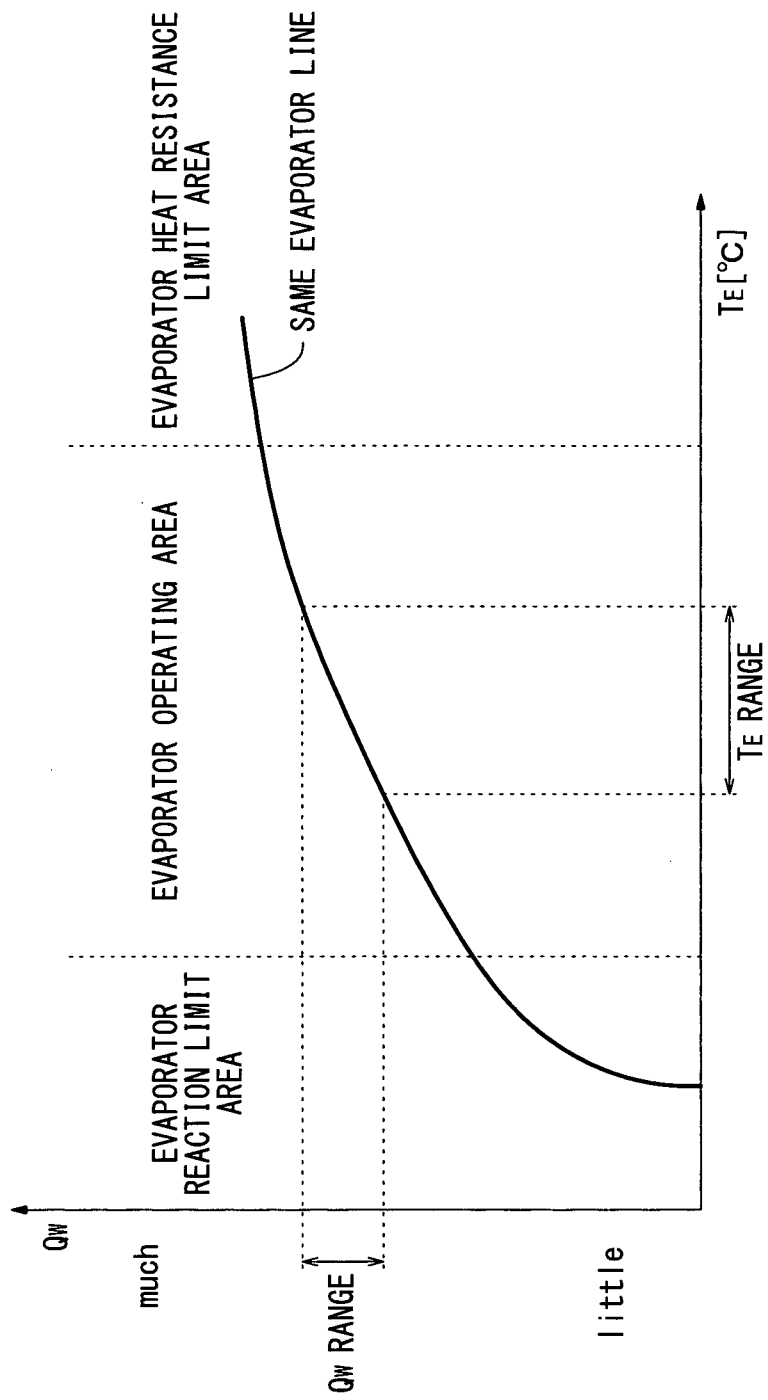
FIG. 7 is a graph showing a relationship between the temperature of an evaporator and a water supply amount to the evaporator.

Next, the control proceeds to step S104, in which the water supply amount determination unit 116 determines a range of the water supply amount $Q_W$ to the evaporator 48 based on the carbon amount C and the steam/carbon ratio. Then, the control proceeds to step S105. The evaporator operating state determination unit 118 determines whether or not the temperature $T_E$ of the evaporator 48 is within a range of the temperature $T_E$ determined based on the determined range of the water supply amount $Q_W$. As shown in FIG. 7, the relationship between the water supply amount $Q_W$ and the temperature $T_E$ of the evaporator 48 is set in advance as an evaporator line, and it is determined whether or not the intersection points on the evaporator line are within the evaporator operating area.

In step S105, if the evaporator operating state determination unit 118 determines that the temperature $T_E$ of the evaporator 48 is within a range of the temperature $T_E$ determined based on the determined range of the water supply amount $Q_W$ (YES in step S105), then the control proceeds to step S106. In step S106, the reforming preparation determination unit 122 determines whether it is required to prepare for reforming by the partial oxidation reformer 45 or not.

In contrast, if the evaporator operating state determination unit 118 determines that the temperature $T_E$ of the evaporator 48 is not within the range of the temperature $T_E$ determined based on the determined range of the water supply amount $Q_W$ (NO in step S105), then the control proceeds to step S107. In step S107, the partial oxidation reformer 45 is controlled by the partial oxidation reformer controller 126 of the reformer control unit 120, and the process for partial oxidation reaction is performed.

In step S106, if it is determined that it is required to prepare for reforming by the partial oxidation reformer 45 (YES in step S106), then the control proceeds to step S108. In step S108, the steam reformer 46 is controlled by the steam reformer controller 124 of the reformer control unit 120, and the process for steam reforming reaction is performed. Then, the control proceeds to step S109, in which the partial oxidation reformer 45 is controlled by the partial oxidation reformer controller 126, and the process for partial oxidation reforming reaction is performed.

If it is determined that it is not required to prepare for reforming by the partial oxidation reformer 45 (NO in step S106), then the control proceeds to step S110. In step S110, the steam reformer 46 is controlled by the steam reformer controller 124.

In the present embodiment, as shown in FIG. 1, the fuel cell module 12 includes the fuel cell stack 24 formed by stacking a plurality of the fuel cells 22 for generating electricity by electrochemical reactions of the fuel gas and the oxygen-containing gas, the partial oxidation reformer 45 for reforming a mixed gas of the raw fuel chiefly containing hydrocarbon and the oxygen-containing gas, the steam reformer 46 for reforming the mixed gas of the raw fuel and the water vapor, and the evaporator 48 for evaporating the water and supplying the water vapor to the steam reformer 46.

The control device 20 includes the carbon amount determination unit 110 for determining the amount of carbon in the fuel gas supplied to the fuel cell stack 24 depending on a required output of the fuel cell stack 24, the temperature detector unit 112 for detecting the temperature of the steam reformer 46 and the temperature of the evaporator 48, the S/C determination unit 114 for determining the range of the steam/carbon ratio based on the temperature of the steam reformer 46, the water supply amount determination unit 116 for determining the range of the water supply amount to the evaporator 48 based on the amount of carbon and the steam/carbon ratio, the evaporator operating state determination unit 118 for determining whether or not the temperature of the evaporator 48 is the temperature determined based on the range of the water supply amount, and the reformer control unit 120 for controlling the steam reformer 46 and the partial oxidation reformer 45 based on the determination result of the evaporator operating state determination unit 118.

Thus, based on the conditions of the fuel gas, the steam reformer 46, the evaporator 48, the steam/carbon ratio and the water supply amount $Q_W$, it is possible to suitably and selectively use the highly efficient steam reformer 46 and the partial oxidation reformer 45 having good performance in starting operation and good responsiveness. Therefore, the fuel cell module 12 can suitably balance a highly efficient function with a function having a good start-up performance and good response performance.

Further, even if operation of the fuel cell stack 24 may exceed the operating range of the steam reformer 46 due to variation in the load on the fuel cell stack 24, the partial oxidation reformer 45 can be operated for compensation. Thus, it becomes possible to follow the load variation and suppress fuel shortage resulting from the shortage of reforming, and improvement in the durability of the fuel cell module 12 is achieved suitably.

Further, the reformer control unit 120 includes the steam reformer controller 124 and the partial oxidation reformer controller 126. If it is determined that the temperature $T_E$ of the evaporator 48 is the temperature determined based on the range of the water supply amount $Q_W$, then the steam reformer controller 124 controls the steam reformer 46, and if it is determined that the temperature $T_E$ of the evaporator 48 is not the temperature determined based on the range of the water supply amount $Q_W$, then the partial oxidation reformer controller 126 controls the partial oxidation reformer 45.

Thus, if the temperature $T_E$ of the evaporator 48 is the temperature determined based on the range of the water supply amount $Q_W$, then the highly efficient steam reformer 46 can be used. Therefore, the fuel cell module 12 can be operated highly efficiently easily.

In contrast, if the temperature $T_E$ of the evaporator 48 is not the temperature determined based on the range of the water supply amount $Q_W$, then the partial oxidation reformer 45 having good start-up performance and good response performance is used. Thus, improvement in the start-up performance and response performance of the fuel cell module 12 is achieved easily.

Further, the control device 20 includes the reforming preparation determination unit 122. If it is determined that the temperature $T_E$ of the evaporator 48 is the temperature determined based on the range of the water supply amount $Q_W$, the reforming preparation determination unit 122 determines whether it is required to prepare for reforming by the partial oxidation reformer 45 or not. Thus, even if operation of the fuel cell stack 24 may exceed the operating range of the steam reformer 46, the partial oxidation reformer 45 can be operated for compensation. Thus, it becomes possible to follow the load variation and suppress fuel shortage resulting from the shortage of reforming, and improvement in the durability of the fuel cell module 12 is achieved suitably.

Further, the fuel cell module 12 is a solid oxide fuel cell module. Therefore, the fuel cell module 12 is applicable to high temperature type fuel cells 22 such as SOFC.

Although certain preferred embodiments of the present invention have been shown and described in detail, it should be understood that various changes and modifications may be made therein without departing from the scope of the appended claims.

The invention claimed is:

1. A fuel cell system including a fuel cell module and a control device;

the fuel cell module comprising:

a fuel cell stack formed by stacking a plurality of fuel cells for generating electricity by electrochemical reactions of a fuel gas and an oxygen-containing gas;

a partial oxidation reformer for reforming a mixed gas of a raw fuel chiefly containing hydrocarbon and an oxygen-containing gas;

a steam reformer for reforming a mixed gas of the raw fuel and water vapor;

an evaporator for evaporating water and supplying the water vapor to the steam reformer;

an exhaust gas combustor for combusting the fuel gas and the oxygen-containing gas discharged from the fuel cell stack to produce a combustion gas;

a heat exchanger for raising a temperature of the oxygen-containing gas by heat exchange with the combustion gas and supplying the oxygen containing gas to the fuel cell stack, wherein the exhaust gas combustor is provided integrally in the heat exchanger, the control device comprising:

a temperature detector unit comprising a steam reformer temperature sensor for detecting a temperature of the steam reformer and an evaporator temperature sensor for detecting a temperature of the evaporator;

a carbon amount determination unit for determining an amount of carbon in the fuel gas supplied to the fuel cell stack depending on a required output of the fuel cell stack;

a central processing unit and a memory having a program stored thereon, the program when executed by the central processing unit causing the control device to operate as:

a carbon amount determination unit for determining an amount of carbon in the fuel gas supplied to the fuel cell stack depending on a required output of the fuel cell stack;

an S/C determination unit for determining a range of steam/carbon ratio based on the temperature of the steam reformer;

a water supply amount determination unit for determining a range of the water supply amount to the evaporator based on the amount of carbon and the steam/carbon ratio;

an evaporator operating state determination unit for determining whether or not the temperature of the evaporator is a temperature determined based on the range of the water supply amount to the evaporator; and a reformer control unit adapted to control at least one regulator valve to supply only the raw fuel to the partial oxidation reformer and the water vapor mixed with the raw fuel to the steam reformer when it is determined by the evaporator operating state determination unit that the temperature of the evaporator is equal to or more than the temperature determined based on the range of the water supply amount to the evaporator.

2. The fuel cell system according to claim 1, wherein execution of the program stored on the memory by the central processing unit further causes the control device to operate as the reformer control unit which includes:

a steam reformer controller for controlling the steam reformer when it is determined that the temperature of the evaporator is a temperature determined based on the range of the water supply amount to the evaporator; and a partial oxidation reformer controller for controlling the partial oxidation reformer when it is determined that the temperature of the evaporator is not the temperature determined based on the range of the water supply amount to the evaporator.

3. The fuel cell system according to claim 1, wherein the fuel cell module is a solid oxide fuel cell module.

4. The fuel cell system according to claim 1, wherein execution of the program by the central processing unit causes the control device to further operate as a reforming preparation determination unit for determining whether or not it is required to prepare for reforming by the partial oxidation reformer when it is determined that the temperature of the evaporator is the temperature determined based on the range of the water supply amount to the evaporator.

5. The fuel cell system according to claim 2, wherein execution of the program by the central processing unit causes the control device to further operate as a reforming preparation determination unit for determining whether or not it is required to prepare for reforming by the partial oxidation reformer when it is determined that the temperature of the evaporator is the temperature determined based on the range of the water supply amount to the evaporator.

* * * * *